United States Patent Office 3,567,685
Patented Mar. 2, 1971

3,567,685
POLYMER OF A DIHYDRIC PHENOL
AND AN IMIDE
Charles A. Bialous, Mount Vernon, Ind., and Milton L. Evans, Schenectady, N.Y., assignors to General Electric Company
No Drawing. Continuation-in-part of application Ser. No. 603,463, Dec. 21, 1966. This application Aug. 26, 1969, Ser. No. 853,202
Int. Cl. C08g 17/13
U.S. Cl. 260—47       5 Claims

ABSTRACT OF THE DISCLOSURE

A composition consisting of the reaction product of a dihydric phenol, a particular imide and a carbonyl halide wherein the particular imide is either

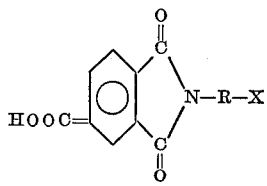

or

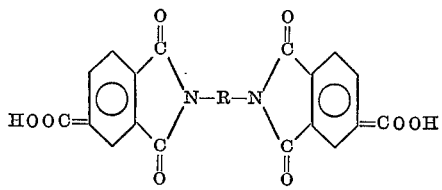

or mixtures thereof. In the formulas, R is divalent hydrocarbon radical containing 1 to 25 carbon atoms and X is either a carboxyl, a mercapto, a hydroxyl or a secondary amino group.

---

This invention is a continuation-in-part of U.S. patent application Ser. No. 603,463 filed Dec. 21, 1966, now abandoned.

This invention is directed to particular novel carbonate polymers and in particular novel copolymers prepared by reacting a dihydric phenol, a particular imide and a carbonyl halide.

Polycarbonates are a relatively new class of thermoplastics that have recently become a fast growing commercial product. They are a member of the tough thermoplastic family and exhibit excellent properties of toughness, flexibility, impact resistance, high heat distortion temperature, etc. These polycarbonates are generally prepared by reaction bisphenol-A and phosgene. However, while the polycarbonates enjoy many of these excellent properties, they have certain drawbacks in that they have poor resistance to certain chemicals. In addition, there is an increasing demand for thermoplastic materials having even higher heat distortion temperatures since there is a demand thereof in areas where resistance to high temperatures are needed.

It has been surprisingly discovered taht much greater resistance to certain chemicals and higher heat resistance can be achieved by preparing particular carbonate copolymers while the copolymers still retain the very excellent properties of toughness, flexibility, etc. These copolymers have excellent resistance to such chemicals as carbon tetrachloride, gasoline, phosphate esters, etc. and have high heat distortion temperatures.

Therefore, it is an object of this invention to provide a particular novel carbonate copolymer.

These and other objects of this invention will become apparent to one skilled in the art from the following detailed description thereof.

Briefly, according to this invention, the foregoing and other objects are attained by reacting a dihydric phenol, a particular imide and a carbonyl halide. The particular imide employed herein is selected from the group consisting of:

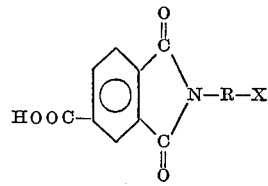

and

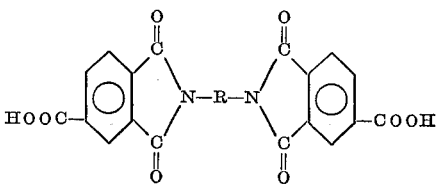

and mixtures thereof. R in the above formulas is a divalent hydrocarbon radical and contains 1–25 carbon atoms and is selected from the group consisting of arylene, alkyl-arylene, aryl-alkylene, cycloalkylene, alkylene and heterocyclic, and X is a mono functional group selected from the group consisting of a carboxyl, a mercapto, a hydroxyl and a secondary amino group.

The following examples are set forth to illustrate more clearly the principle and practice of this invention where parts or percentages are mentioned, they are parts or percentages by weight.

EXAMPLE I

This example is directed to preparing an imide employed in the practice of this invention for preparing the novel carbonate copolymer.

One mole of trimelletic anhydride is reacted with one mole of p-aminobenzoic acid in dimethyl formamide. The mixture is heated at reflux conditions for about two (2) hours. Water and dimethyl formamide are distilled off. A precipitate is formed and the mixture is cooled to room temperature. The precipitate is filtered, dried at about 140° C. and recrystallized from pyridine. The imide so obtained is 4-carboxy-N-(4-carboxyphenyl) phthalimide as determined by infrared spectrum analysis and carbon/hydrogen/nitrogen elemental analysis and has the following chemical configuration:

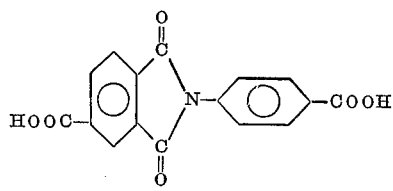

EXAMPLE II

Example I is repeated except that p-aminophenol is employed herein in place of the p-aminobenzoic acid. The resulting imide is 4-carboxy-N-(4-hydroxyphenyl) phthalimide as determined by the same analyses as employed in Example I and has the following configuration.

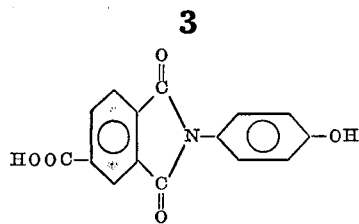

EXAMPLE III

Example I is repeated except that in place of the one-mole of trimelletic anhydride employed herein, two moles are employed herein and in place of the p-aminobenzoic acid, 4,4'-diamino diphenyl methane is employed herein.

The resulting imide so prepared has the following chemical configuration:

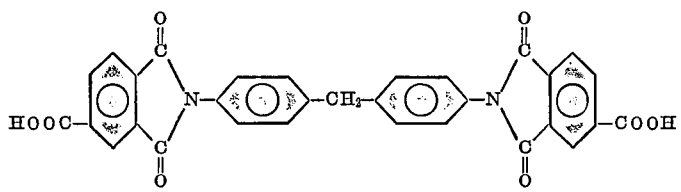

EXAMPLE IV

This example is directed to preparing the novel carbonate copolymer of this invention employing the imide of Example I.

To a reaction flask fitted with a stirrer, a reflux condenser and a phosgene inlet tube, charge 456.6 grams of bisphenol-A (2.0 moles) and 3,300 grams of methylene chloride. While stirring, a solution of 63.4 grams of the imide of Example I (0.2 mole) in 450 grams of pyridine is then added, which imide solution is prepared at a temperature of about 100° C. Phosgene is then added to the mixture at a rate of about 1.4 grams per minute. The end point is reached when the temperature drops and a heavy viscous solution is obtained. The polymer is precipitated with a methanol/hydrochloric acid solution. The polymer is washed, dried and extruded into pellets.

The copolymer prepared herein is identified as Copolymer A.

EXAMPLE V

Example IV is repeated except that in place of the imide of Example I, the imide of Example II is employed herein.

The copolymer prepared herein is identified as Copolymer B.

EXAMPLE VI

This example is also directed to preparing the novel carbonate copolymer of this invention employing the imide of Example III.

The imide of Example III is first converted to the acid chloride by reacting the imide with thionyl chloride. To a reaction flask fitted with a stirrer, reflux condenser, and a phosgene inlet tube, charge 203.2 grams (0.89 mole) bisphenol-A and 39.4 grams of the acid chloride of the imide of Example III (0.067 mole), 2,118 g. methylene chloride, and 230 g. pyridine. Phosgene is then added to the mixture at a rate of about 1.4 grams per minute. The end point is reached when the temperature drops and a heavy viscous solution is obtained. The polymer is precipitated with a methanol/hydrochloric acid solution. The precipitate is washed, dried and extruded into pellets.

The copolymer so prepared is identified as Copolymer C.

EXAMPLE VII

This example is directed to preparing the novel carbonate copolymer of this invention employing the imide of Example I.

To a reaction flask fitted with a stirrer, reflux condenser and phosgene inlet tube, charge 319.6 grams bisphenol-A (1.4 moles) 171.5 g. (0.56 mole) of the imide of Example I and 3,634 g. pyridine. The temperature is maintained between 70° C. and 100° C. and phosgene is added at a rate of about 1.4 grams per minute. The end point is reached when a heavy viscous solution is obtained. The polymer is precipitated with a methanol/hydrochloric acid solution. The polymer is washed, dried and extruded into pellets.

The copolymer so prepared is identified as Copolymer D.

EXAMPLE VIII

Impact bars, 2½" x ½" x ⅛" are molded employing the copolymers of Examples IV, V, VI and VII. As a control, impact bars molded from a polycarbonate of bisphenol-A and phosgene are prepared and are designated as E. The impact bars are then tested for flexural heat distortion in accordance with ASTM Flexural Test D648. The results are as follows:

| Samples: | Flexural heat distortion, ° C. |
|---|---|
| Copolymer A | 156.5 |
| Copolymer B | 146.5 |
| Copolymer C | 153.0 |
| Copolymer D | 174.0 |
| Copolymer E | 132.0 |

EXAMPLE IX

The impact bars as employed in Example VIII are then tested for chemical resistance employing the single drop test method, which test measures the critical elongation in percent strain. Critical elongation is defined as the maximum flexural strain that can be placed on the impact bar without crazing or cracking when exposed to a given chemical. The chemicals employed herein are phosphate ester hydraulic fluid (prepared by Monsanto Company), high test gasoline and carbon tetrachloride.

| Sample | Critical elongation (percent strain) | | |
|---|---|---|---|
| | Phosphate ester | Gasoline | Carbon tetrachloride |
| Copolymer: | | | |
| A | 5.0 | 1.4 | 3.4 |
| B | 3.4 | 0.5 | 2.4 |
| C | 2.5 | 0.5 | 2.5 |
| D | 5.0 | 1.5 | 5.0 |
| E | 0.5 | 0.3 | 0.6 |

The instant invention is directed to a novel carbonate polymer system having improved heat distortion and chemical resistance. While polycarbonates of bisphenol-A and phosgene have excellent heat distortion temperatures when first discovered and disclosed in U.S. Patent 3,028,365, they exhibit poor resistance to certain chemical materials. There is, currently a demand for materials having even higher heat resistance and better chemical resistance. With the instant invention, it has now been discovered that a particular carbonate polymer system has much improved chemical resistance and much higher heat distortion temperatures. The results of Examples VIII and IX clearly show that the polymer systems of this invention have a higher heat distortion temperature than a polycarbonate of bisphenol-A and phosgene while exhibiting much improved chemical resistance. These advantages are achieved even with copolymers prepared by reacting minor amounts of the imide with a bisphenol-A.

The novel polymers of this invention consist of the reaction product of (1) a dihydric phenol, (2) a particular imide, and (3) a carbonyl halide. The particular imides employed in the practice of this invention are those selected from the group consisting of:

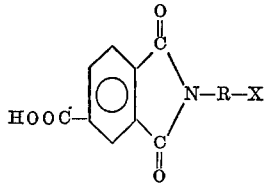

and

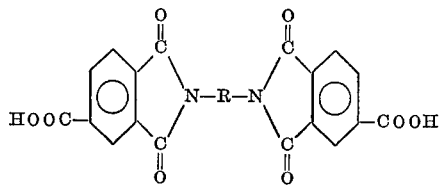

and mixtures thereof. In the above formula, R is a divalent hydrocarbon radical containing 1–25 carbon atoms and is selected from the group consisting of arylene, alkylarylene, arylalkylene, cycloalkylene, alkylene and heterocyclic radicals. X is a mono functional group selected from the group consisting of a carboxyl, a mercapto, a hydroxyl or a secondary amino group. In the practice of this invention, several preferred imides are suitable and these are:

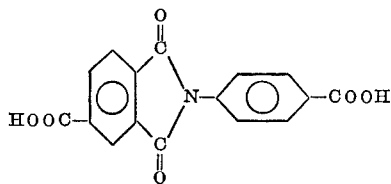

or

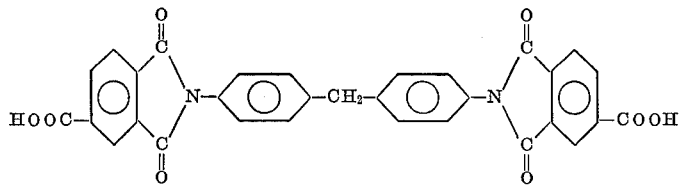

or

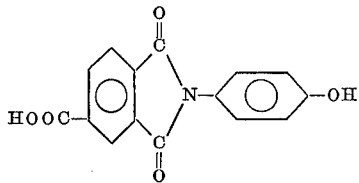

The imides employed in the practice of this invention are those imides prepared by the reaction of trimelletic anhydride with mono-primary amines containing a mono functional group which is either a carboxyl, a mercapto, a hydroxyl, or a secondary amino group. Also included herein are those imides prepared by reacting 2 moles of trimelletic anhydride with a di-primary amine.

The imides employed in place of those in the examples and which produce essentially the same results are prepared from the reaction of mono-primary amines with trimelletic anhydride correspond to the following general reaction:

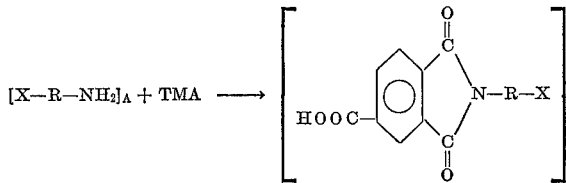

Wherein:

| A | B |
|---|---|
| p-Aminothiophenol | → 4-carboxy-N-(4-mercaptophenyl) phthalimide. |
| N-phenyl-p-phenylene diamine. | → 4-carboxy-N-(4-anilinophenyl) phthalimide. |
| p-Aminocinnamic acid | → 4-carboxy-N-(4-2 carboxy vinylphenyl) phthalimide. |
| 4-aminocyclohexanol | → 4-carboxy-N-(4-hydroxycyclohexyl) phthalimide. |
| Aminoacetic acid | → 4-carboxy-N-(carboxymethyl) phthalimide. |

The imides employed in place of those in the examples and which produce essentially the same results are prepared from the reaction of di-primary amines with trimelletic anhydride correspond to the following general reaction:

[H$_2$N—R—NH$_2$]$_A$ + 2TMA ⟶

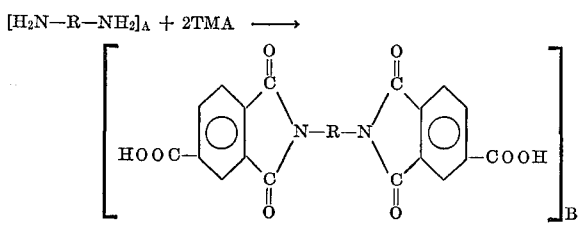

Wherein:

| A | B |
|---|---|
| Hexamethylenediamine | → 1,6-bis(4-carboxyphthalimido)hexane. |
| p-Phenylenediamine | → 1,4-bis(4-carboxyphthalimido)benzene |
| 4,4'-diaminobiphenyl (benzidine). | → 4,4'-bis(4-carboxyphthalimido)biphenyl. |
| 4,4'-diaminodiphenyl ether (oxydianiline). | → 4,4'-bis(4-carboxyphthalimido) diphenyl ether. |
| 4,4'diaminodiphenyl sulfone. | → 4,4'-bis(4-carboxyphthalimido) diphenyl sulfone. |
| Benzoguanamine | → 3,5-bis(4-carboxyphenyl) benzoguanamine. |

The proportion of the monomer that can be reacted can vary depending upon the end use application of the copolymer and the properties desired. Preferably, the proportions vary from about 9.9–6.0 moles and particularly 9.5–8.5 moles of the dihydric phenol, and correspondingly, about 0.4–4.0 moles and particularly 0.5–1.5 moles of the particular imide.

The dihydric phenols that can be employed in the practice of this invention are any of the well known dihydric phenols. Preferably, the dihydric phenols employed in the practice of this invention can be those compounds disclosed in U.S. Patents 3,028,365, 2,999,835, 3,030,331 and 3,169,121, all of which are hereby incorporated by reference. The dihydric phenols which can be employed in place of the bisphenol-A (2,2-bis(4-hydroxyphenyl) propane) used in the examples to prepare the carbonate polymers are mononuclear or polynuclear aromatic compounds containing as functional groups, two hydroxy radicals, each of which is attached directly to a carbon atom of an aromatic nucleus and are, for example, 2,2'-bis-(4-hydroxy-3-methylphenyl)-propane, 1,1-bis - (4 - hydroxyphenyl) cyclohexane, 4,4'-dihydroxydiphenyl, 4,4'-dihydroxydiphenyl sulfone, 4,4'-dihydroxydiphenyl ether, 2,6-dihydroxynaphthalene and 1,1-bis-(4-hydroxyphenyl) 2,2,2-trichloroethane. In the practice of this invention, it is, of course, possible to employ two or more different dihydric phenols or a copolymer of a dihydric phenol with a glycol, a hydroxy or an acid-terminated polyester, or a dibasic acid in the event a carbonate copolymer rather than a homopolymer is desired for use in the preparation of the novel carbonate polymers of this invention.

The carbonyl halide employed in the practice of this invention can be carbonyl chloride, carbonyl bromide or carbonyl fluoride. Preferably, the carbonyl halide employed herein is phosgene, a carbonyl chloride.

It will thus be seen that the objects set forth above, among those made apparent from the preceding description are efficiently attained, and since certain changes may be made in carrying out the above process and the composition set forth without departing from the scope of the invention, it is intended that all matters contained in the above description shall be interpreted as illustrative and not in a limiting sense.

What is claimed is:

1. A polymer consisting of the reaction product of (1) 9.9–6.0 moles of a dihydric phenol, (2) 0.4–4.0 moles of an imide selected from the group consisting of:

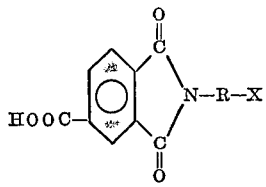

and

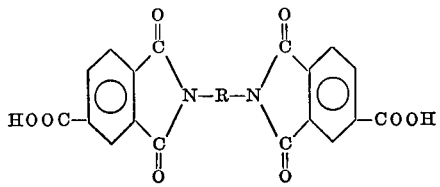

and mixtures thereof, wherein R is a divalent hydrocarbon radical containing 1–25 carbon atoms and is selected from the group consisting of arylene, alkyl-arylene, aryl-alkylene, cycloalkylene and alkylene radicals and X is a mono functional group selected from the group consisting of a carboxyl, a mercapto, a hydroxyl and anilino, and (3) a carbonyl halide.

2. The composition of claim 1 wherein the polymer is the reaction product of 9.5–8.5 moles of the dihydric phenol and, correspondingly, 0.5–1.5 moles of the imide.

3. The composition of claim 1 wherein the dihydric phenol is 2,2-bis-(4-hydroxyphenyl)-propane.

4. The composition of claim 1 wherein the imide is:

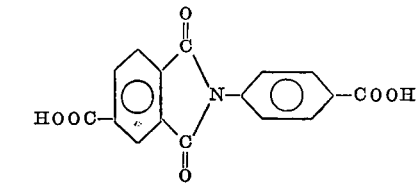

5. The composition of claim 1 wherein the imide is:

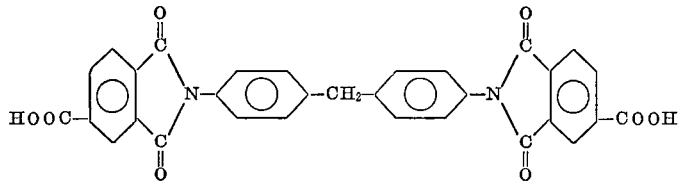

References Cited

UNITED STATES PATENTS

| | | | |
|---|---|---|---|
| 3,205,199 | 9/1965 | Preston et al. | 260—47 |
| 3,320,211 | 5/1967 | Bissinger et al. | 260—47 |
| 3,399,172 | 8/1968 | Jaquiss | 260—47 |

SAMUEL H. BLECH, Primary Examiner

U.S. Cl. X.R.

260—326

UNITED STATES PATENT OFFICE
CERTIFICATE OF CORRECTION

Patent No. __3,567,685__          Dated __March 2, 1971__

Inventor(s) __C. A. Bialous and M. L. Evans__

It is certified that error appears in the above-identified patent and that said Letters Patent are hereby corrected as shown below:

In the Abstract, column 1, line 23, the left-hand part the formula should appear as follows:

HOOC=        should read     HOOC-

In the Abstract, column 1, line 32, the far left-hand far right-hand parts of the formula should appear as follows:

HOOC=    =COOH    should read    HOOC-    -COOH

In column 1, line 62 "taht" should be --that--.

Signed and sealed this 11th day of January 1972.

(SEAL)
Attest:

EDWARD M. FLETCHER, JR.        ROBERT GOTTSCHALK
Attesting Officer             Acting Commissioner of Pa